United States Patent
Hanafusa

(10) Patent No.: US 8,966,168 B2
(45) Date of Patent: Feb. 24, 2015

(54) MEMORY AND METHOD FOR STORING INTEGRATED SERIAL DATA AS DIVIDED DATA IN PARALLEL MEMORIES, PERFORMING READ CONTROL BASED ON A NUMBER OF VALID MEMORIES, AND CONTROLLING INTEGRATION OF THE DIVIDED DATA

(71) Applicant: Kabushiki Kaisha Toshiba, Tokyo (JP)

(72) Inventor: Yuichiro Hanafusa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 104 days.

(21) Appl. No.: 13/748,035

(22) Filed: Jan. 23, 2013

(65) Prior Publication Data

US 2013/0304967 A1 Nov. 14, 2013

(30) Foreign Application Priority Data

May 11, 2012 (JP) ................................. 2012-110109

(51) Int. Cl.
*G06F 13/00* (2006.01)
*G06F 12/02* (2006.01)
*G06F 11/10* (2006.01)

(52) U.S. Cl.
CPC .......... *G06F 12/0246* (2013.01); *G06F 11/108* (2013.01); *G06F 11/1004* (2013.01); *G06F 2212/7208* (2013.01)
USPC ............. 711/109; 711/103; 711/114; 710/71; 710/56; 710/57

(58) Field of Classification Search
USPC ................. 711/109, 103, 114; 710/71, 56, 57
See application file for complete search history.

(56) References Cited

U.S. PATENT DOCUMENTS

2010/0125695 A1* 5/2010 Wu et al. ........................ 711/103
2013/0251006 A1* 9/2013 Maji et al. ..................... 375/219

FOREIGN PATENT DOCUMENTS

JP 11-95933 4/1999

* cited by examiner

*Primary Examiner* — Hong Kim
(74) *Attorney, Agent, or Firm* — Oblon, Spivak, McClelland, Maier & Neustadt, L.L.P.

(57) ABSTRACT

An information memory system in which data received is divided into pieces of data, which are stored in memories in parallel, includes controller configured to storing a number of the divided pieces of data and monitoring a read request and a buffer full notice, in a case where the number of read requests does not reach the number of valid memory units and the buffer full notice continues in all buffers except for one buffer which does not output the read request, performing a read control corresponding to the buffers which output the buffer full notice, and performing control of the integration of a piece of data reconstructed, after being read from the memory unit corresponding to the buffer which does not output the read request and the pieces of data read from the memory units corresponding to the buffers which output the buffer full notice.

3 Claims, 7 Drawing Sheets

MEMORY AND METHOD FOR STORING INTEGRATED SERIAL DATA AS DIVIDED DATA IN PARALLEL MEMORIES, PERFORMING READ CONTROL BASED ON A NUMBER OF VALID MEMORIES, AND CONTROLLING INTEGRATION OF THE DIVIDED DATA

CROSS-REFERENCE TO RELATED APPLICATIONS

This application is based upon and claims the benefit of priority from the prior Japanese Patent Application No. 2012-110109, filed on May 11, 2012, the entire content of which is incorporated herein by reference.

FIELD

The present embodiment relates to a high-speed large-capacity information memory system using semiconductor disc memories and a memory abnormality processing method.

BACKGROUND

Large capacity memory systems using high-speed access semiconductor memories have become common in recent years. Particularly in the case of a large-capacity memory system for file transfer through a high-speed giga-bit network, flash memories are mounted as blocks in multiple units in a distributed manner, and file data received serially is dividedly programmed to and read from the units in parallel.

For the purpose of dealing with the occurrence of failure, malfunction and the like in these multiple units, the program/read process is carried out while combined with error detection and error correction processes.

FIG. 6 is a functional block diagram showing a functional configuration for the memory control of a conventional information memory system in which one storage unit includes five memory units. FIG. 2 is a frame structure diagram showing a frame structure of data which is programmed to and stored in the memory units in this information memory system. FIG. 7 is a flowchart for explaining a conventional program/read process procedure.

Referring to FIGS. 6, 2 and 7, descriptions will be provided hereinbelow for the conventional operation procedure for programming and reading data to and from units in parallel.

In FIG. 6, an information memory system MS has a memory control unit MCU and NAND flash memory units MU #1 to #5. The memory units MU #1 to #4 record (store) the same input data, or inputted data blocks into which the data is divided in a specified process procedure as described below, and the memory unit MU #5 stores parity data for detecting and correcting a failure in any one of the memory units MU #1 to #4.

The memory control unit MCU includes: a record/playback controller cx; a network interface (I/F) ni for receiving and transmitting data through a network; a RS encoder re for performing a RS (Reed Solomon) encoding process on the data; a RS decoder rd for performing a RS decoding process on the data; and a unit manager bc for controlling the data received and transmitted through the memory units MU.

The record/playback controller cx performs a RS process on serial data received and transmitted through the network interface ni at high speed, and performs overall control of the program (recording) and read (playback and file output) of the input/output data of the memory units MU through the unit manager bc.

Data received and transmitted through the network is formatted into data packets which are allocated per communication channel, and are treated as a large frame block with a capacity of 20 channels, for example. In addition, since the data which is dividedly recorded in the four memory units MU #1 to #4 is read, the data for five channels is recorded in each memory unit MU.

The unit manager bc controls the operation of the five memory units MU #1 to #5 including the above four memory units MU for RS-processed data and additionally one memory unit MU for storing (recording) parity data. Although the configuration having the five memory units MU including the four data recording memory units MU and the one memory unit MU for parity is described herein as an example, the configuration may include four memory units MU including three data recording memory units MU and one memory unit MU for parity.

The unit manager bc includes: a divider dv for dividing the received data into four data blocks for the memory units MU #1 to #4, respectively, and adding header information for identification information, error correction and the like to each data block; a parity section pc for adding check bits for detecting an error to the data; checksum adders cs #1 to #5 for adding checksum bits to the data received from the divider dv and the parity section pc, and transmitting the resultant data to the memory units MU #1 to #5 as program data; buffers BF #1 to #5 for buffering read data received from the memory units MU #1 to #5; an error check processor EC; an integrator RC for integrating the four blocks of data into the original series of RS data; and a CPU ca for managing the program and read of the data depending on whether or not each memory unit MU operates normally, by monitoring the buffers BF and the error check processor EC.

The error check processor EC checks an error in the checksums and the like of the data received from the buffers BF #1 to #5, and checks the parity added by the parity section. When detecting an error from one memory unit MU, the error check processor EC rebuilds the four blocks of data by correctly rebuilding the data read from the memory unit MU having the error by use of the data read from the normal memory units MU other than the memory unit MU having the error.

These components in the unit manager bc are connected to the CPU ca through a bus line, and the unit manager bc is connected to the record/playback controller cx through another bus line; or may additionally function as the record/playback controller cx.

In a flowchart shown in FIG. 7, record data like "abc xyz" (see FIG. 2A) is received from the network (step s1); the RS encoder rs RS-encodes the record data into "rx(abc . . . xyz)" (see FIG. 2B) (step s2); and then, the divider dv divides the encoded data into four blocks with control headers h1 to h4, each inclusive of identification information and the like, added to the respective four blocks (see FIG. 2C).

Further, the parity section pc adds parity data P (see FIG. 2D) to the four divided data blocks. For example, the parity data P is a data block whose frame structure is "h5Prx(a-z)" corresponding to the memory unit MU #5 (step s3). This parity process is achieved by horizontal and vertical parity for the purpose of enabling data rebuild from an error.

A checksum "&" for detecting an error in the data to be programmed to the memory units MU #1 to #5 is added to each of these data blocks (see FIG. 2E) by the checksum adder cs (step s4). For example, "h5Prx(a-z)&" is programmed to the memory unit MU #5 (step s5). In addition, "&" added for the checksum takes different values from one data block to another, but the common symbol "&" is used for the different data blocks for the sake of simplicity.

After programming, the CPU ca waits for an instruction from the record/playback controller cx (No in step s6). Further, upon receipt of a read instruction (Yes in step s6), the CPU ca instructs the memory units MU #1 to #5 to prepare for the read (enter into a read cycle) (step s7).

The memory units MU #1 to #5 output the read data to the buffers BF #1 to #5 in order from the top of the read data (step s8). If the amount of buffered data exceeds a specified minimum unit (Yes in step s9), each of the buffers BF #1 to #5 outputs a read request to the CPU ca (step s10).

If the CPU ca receives the read request from all the five memory units MU (Yes in step s31), the CPU ca immediately starts to perform simultaneous read control for the memory units MU (step s32).

The error check processor EC checks the header information of the read data blocks transmitted (step s33) from the buffers BF, namely, the memory units MU #1 to #5. If there is no error in the header (No in step s34), the error check processor EC performs the sum check and the parity check on the data block read from each memory unit MU, and rebuilds the original data block by correcting errors (step s35), thus transmitting the reconstructed original data block.

The integrator RC integrates these transmitted data blocks into one data block (step s36), and further outputs the one data block to the RS decoder rd. Further, the original series of RS-processed data is decoded by the RS decoder rd (step s37), and is eventually played back (step s38).

On the other hand, if there is an error in the header information of the data from any one of the buffers BF (Yes in step s34), all the transferred blocks are discarded (step s39).

In addition, if the amount of data inputted into any buffer BF (for example, #4) from a faulty memory unit MU does not reach the minimum unit after the faulty memory unit MU starts the preparation for the read (No in step s31), the CPU ca cannot start to perform the read control in a freezing state forever, because the CPU ca continues waiting for all the five read requests to arrive at the CPU ca.

High-speed response is achieved by the conventional method in which data inputted and transmitted at high speed is divided into blocks and the divided data blocks are programmed to and read from the respective flash memories in parallel at high speed. However, the conventional method has a problem that: if a fault occurs in any one of the multiple memory units, not only can the data in the faulty unit not be read, but also the entire data cannot be read: and the freezing state accordingly occurs.

For dealing with the occurrence of disorder of a faulty disc, there has been proposed a method in which a recovery process is carried out by referring to the timer after the error detection (for example, Japanese Patent Application Publication No. Hei 11-95933, contents of which are hereby incorporated by reference).

From the reading side outside of the system, however, the condition until the recovery also looks like the operation halt or freeze.

DETAILED DESCRIPTION

Figure 1:
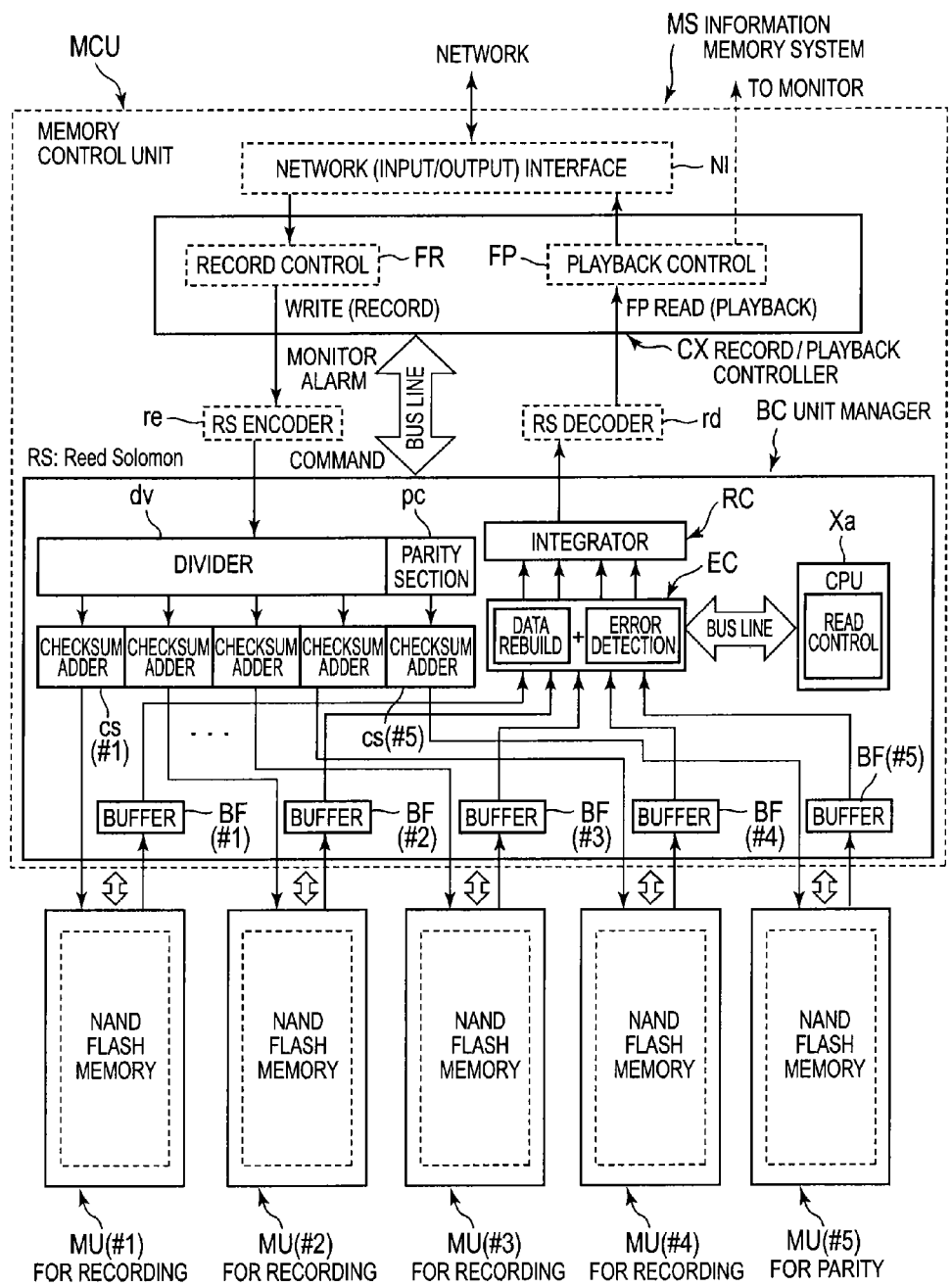
FIG. 1 is a functional block diagram for explaining how the memory control of an information memory system of an embodiment works.
Figure 2A:
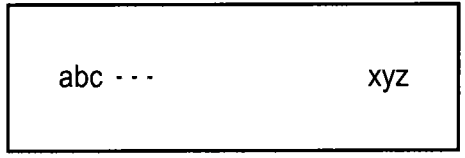
FIG. 2A is a frame structure diagram of data to be programmed to and stored in a memory unit.
Figure 2B:
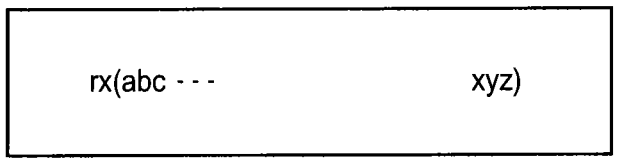
FIG. 2B is a frame structure diagram of data to be programmed to and stored in a memory unit.
Figure 2C:
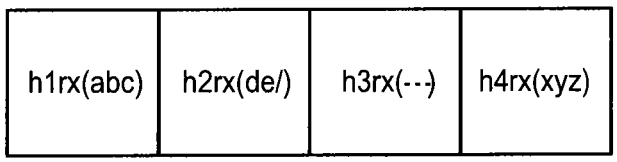
FIG. 2C is a frame structure diagram of data to be programmed to and stored in a memory unit.
Figure 2D:
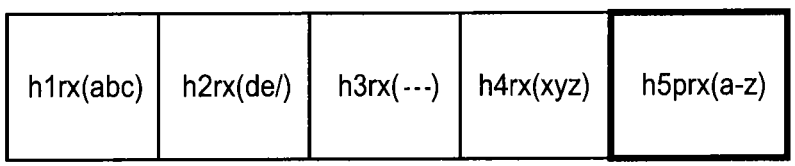
FIG. 2D is a frame structure diagram of data to be programmed to and stored in a memory unit.
Figure 2E:
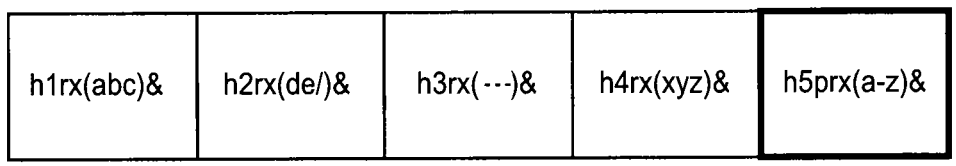
FIG. 2E is a frame structure diagram of data to be programmed to and stored in a memory unit.

The conventional method, in which data inputted and transmitted at high speed is divided into blocks and the divided data blocks are programmed to and read from the respective flash memories in parallel at high speed, has the problem that: if a fault occurs in any one of its memory units, the entire data cannot be read; and the freezing state accordingly occurs.

In view of the above circumstances, it is provided that an information memory system in which data received serially is divided into pieces of data, which are then programmed to and stored in a plurality of flash-memory-equipped large-capacity memory units in parallel, the information memory system including rebuild means for: detecting an error in a piece of data read from at most one of the plurality of memory units; and performing correction and rebuild, and the information memory system configured to integrate the pieces of data read from the memory units in parallel into integrated serial data, and to output the integrated serial data, the information memory system comprising: a plurality of buffers connected to the plurality of memory units respectively, each buffer configured to buffer a received piece of read data, to output a read request if the amount of read data buffered in the buffer exceeds a specified buffer amount, and to output a buffer full notice when the buffer buffers the received piece of read data up to its full capacity; and controller configured to store the number of the divided pieces of data as the number of valid memory units, and monitoring the read request and the buffer full notice, in a case where the number of read requests reaches the number of valid memory units, performing read control on all the plurality of memory units, and controlling the integration of the pieces of read data and the output of the integrated data, in a case where the number of read requests does not reach the number of valid memory units and the buffer full notice continues in all the plurality of buffers except for one buffer which does not output the read request, decrementing the number of valid memory units by one, performing the read control on the memory units corresponding to the buffers which output the buffer full notice, and then performing control of the integration of a piece of data reconstructed by the rebuild means after being read from the memory unit corresponding to the buffer which does not output the read request and the pieces of data read from the memory units corresponding to the buffers which output the buffer full notice, and the output of the integrated data.

In view of the above circumstances, it is provided that a memory abnormality processing method for an information memory system, the information memory system including: a plurality of large-capacity memory units; a plurality of buffers; rebuild means for detecting an error in a piece of data read from at most one of the plurality of memory units, and performing correction and rebuild; and controller, the information memory system in which: data received serially is divided into a plurality of pieces of data, which are then programmed to and stored in the plurality of flash-memory-equipped large-capacity memory units in parallel; and the plurality of pieces of data read from the respective memory units in parallel are integrated into serial data, and the serial data is transmitted, the memory abnormality processing method wherein the plurality of buffers are connected to the plurality of memory units respectively, and each buffer buffers a received piece of read data, outputs a read request if the amount of read data buffered in the buffer exceeds a specified buffer amount, and outputs a buffer full notice when the buffer buffers the received piece of read data up to its full capacity, and the controller stores the number of the divided pieces of data as the number of valid memory units, and monitors the read request and the buffer full notice, in a case where the number of read requests reaches the number of valid memory units, the controller performs read control on all the plurality of memory units, and controls the integration of the pieces of read data and the output of the integrated data, in a case where the number of read requests does not reach the number of valid memory units and the buffer full notice continues in all the plurality of buffers except for one buffer which does not output the read request, the controller decrements the number of valid memory units by one; performs the read control on the memory units corresponding to the buffers which output the buffer full notice; and performs control of the integration of a piece of data reconstructed by the rebuild means after being read from the memory unit corresponding to the buffer which does not output the read request and the pieces of data read from the memory units corresponding to the buffers which output the buffer full notice, and the output of the integrated data.

According to one aspect of the embodiments, is to provide an abnormality processing method for an information memory system, which enables data to be continuously read at high speed without freezing even if abnormality occurs in any one of the memory units.

Descriptions will be hereinbelow provided for an information memory system of an embodiment by referring to the drawings.

Figure 3:
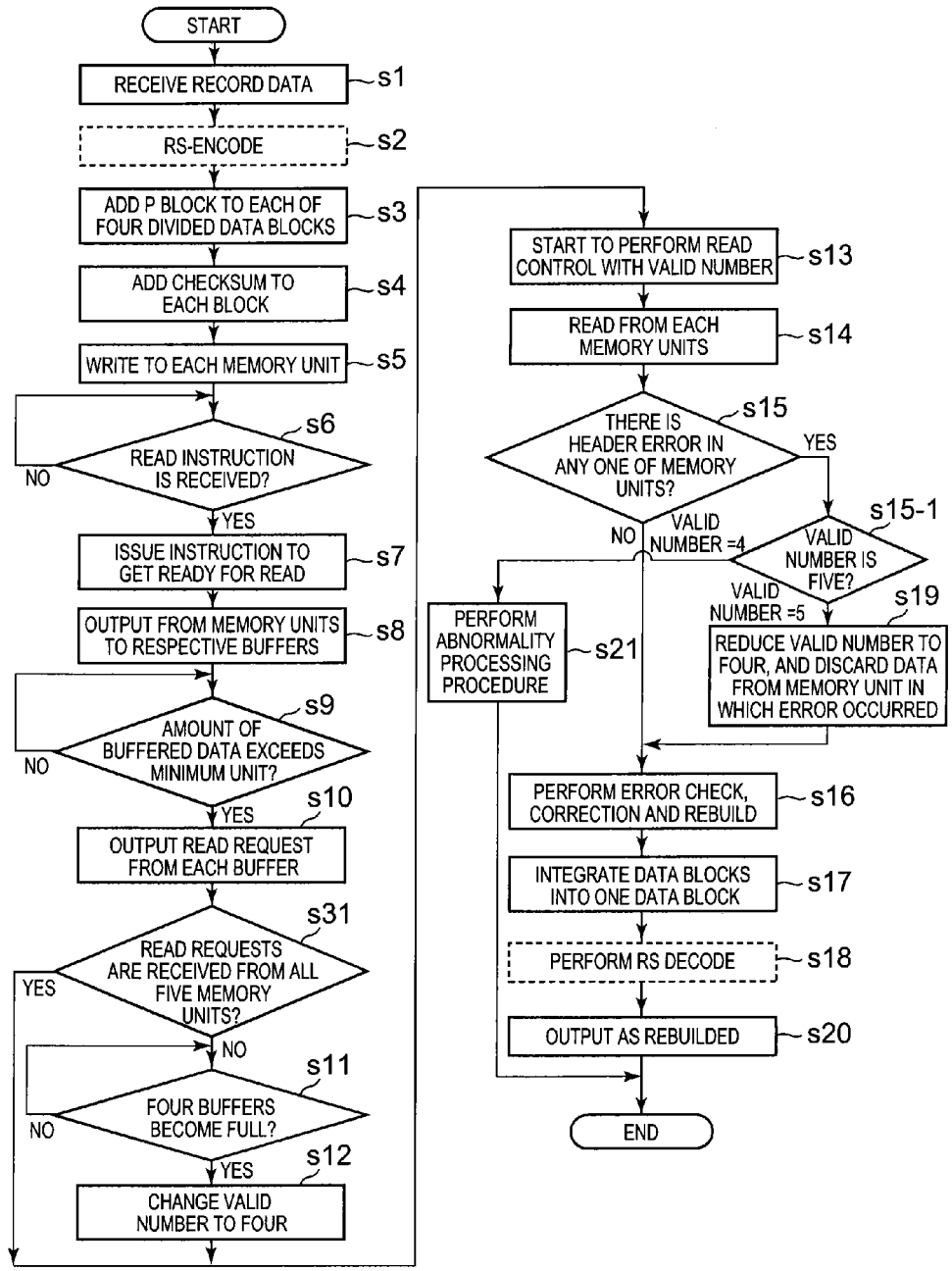
FIG. 3 is a flowchart for explaining a program/read process procedure for the information memory system of the embodiment.

FIG. 1 is a functional block diagram for explaining how the memory control of an information memory system of the embodiment works, with one storage unit formed of five memory units. FIG. 2 is a frame structure diagram showing a frame structure of data which is programmed to and stored in the memory units in the information memory system. FIG. 3 is a flowchart for explaining a program/read process procedure of the information memory system of the embodiment.

Descriptions will be provided for an operation procedure of the embodiment for parallel program to and read from each unit by referring to FIGS. 1, 2 and 3.

Figure 6:
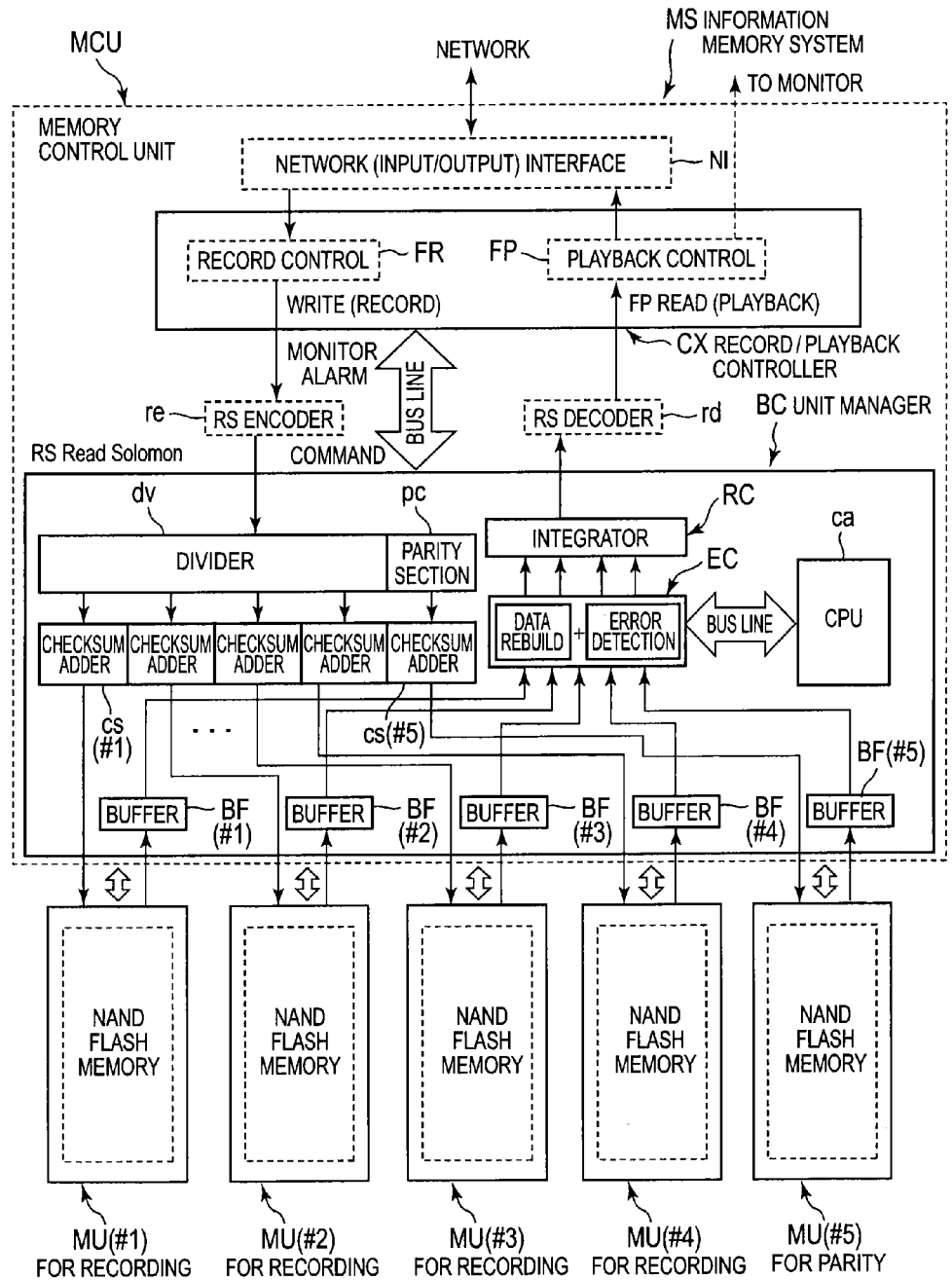
FIG. 6 is a functional block diagram for explaining how the memory control of a conventional memory system works.

A functional block shown in FIG. 1 and the data frame structure shown in FIG. 2 are basically the same as those of the conventional information memory system. In the embodiment, a CPU Xa replaces the CPU ca in the configuration shown in FIG. 6, and a record/playback controller CX replaces the record/playback controller cx in the configuration shown in FIG. 6. Because the object of the invention is to provide a process for combining the multiple memory units, the configuration and processes related to the RS (Reed Solomon) encoding process may be omitted.

A memory control unit MCU includes: a record/playback controller CX; a network interface (I/F) ni for receiving and transmitting data through a network; a RS encoder re for performing a RS encoding process on the data; a RS decoder rd for performing a RS decoding process on the data; and a unit manager BC for controlling the data received and transmitted through the memory units MU.

The record/playback controller CX performs a RS process on serial data received and transmitted through the network interface ni at high speed, and integrally controls the program (recording) and read (playback, and file output) of the data to and from the memory units MU through a unit manager BC.

Data received from and transmitted to the network is formatted into data packets which are allocated per communication channel, and are treated as a large frame block with a capacity of 20 channels, for example. In addition, since the data to be read is dividedly programmed to and read from in the four memory units MU, the data for five channels is programmed to and read from each memory unit MU.

Figure 7:
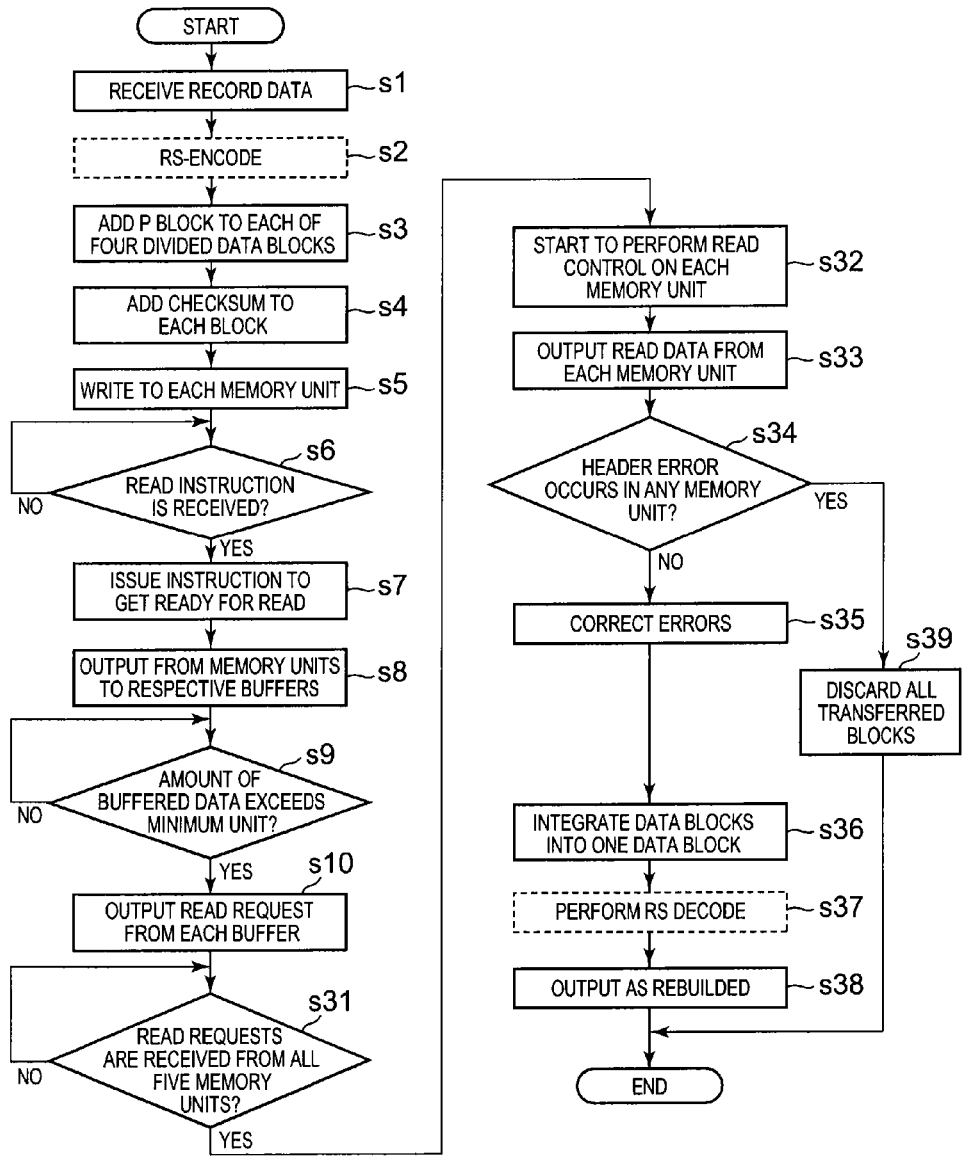
FIG. 7 is a flowchart for explaining a conventional program/read process procedure.

The frame structure of the data to be received from and transmitted into the memory units MU is the same as the conventional one. Steps s1 to s31 in a process procedure shown in the form of a flowchart of FIG. 3 are the same as the conventional ones shown in FIG. 7. For this reason, descriptions for steps s1 to s31 will be omitted, and descriptions will be provided for the operation procedure which is the characteristic features of the embodiment.

The embodiment employs a method in which the program and read of the data is controlled by managing the number of valid memory units MU depending on whether or not each memory unit MU is correctly working. Once a read request is transmitted from any one of the memory units MU #1 to #5 to the CPU Xa (step s10), the CPU Xa further monitors the amount of data buffered in each of the butters BF #1 to #5.

Once the amount of data buffered in each of the five buffers BF #1 to #5 respectively corresponding to the five memory units MU reaches a specified buffer amount (Yes in step s31), the CPU Xa starts to perform the read control on all the memory units MU after resetting the count number of an internal valid number counter (not illustrated) at five which is a default value (step s13).

In a case where the data is read from the five normal memory units MU (step s14), the header information of the data read from each memory unit MU is checked by an error check processor EC. If there is no error (No in step s15), the correction and data rebuild is performed through the error detection based on the sum check and parity check of the data (step s16).

It should be noted that as in the case of the conventional example, an error check processor EC is configured: to perform the error check on the checksum and the like of the data received from each of the buffers BF #1 to #5 as well as the horizontal and vertical parity check and the like, which have been added by the parity section pc, on the data; and to reconstruct the four data blocks by correcting an error in the data read from a memory unit MU, in which the error has occurred, as long as the number of memory units in which an error is detected is one.

Further, an integrator PC integrates the four data blocks into one data block (step s17). Subsequently, the one data block thus integrated is RS-decoded (step s18), and the resultant data block is transmitted as reconstructed (step s20).

Furthermore, if an error is detected in the header information when the header information is checked (Yes in step s15), and if the valid number is five (if five in step s15-1), an alarm is issued to the memory unit MU in which the error occurred in the head data, and the data block is discarded from the memory unit MU (step s19). In this case, the valid number is temporarily changed to four. Further, the data rebuild is performed using the data blocks read from the remaining memory units MU, whose header information is normal, on the basis of: the error check based on the sum check and parity check; and the correction (step s16). Subsequently, the reconstructed data blocks is integrated into one data block (step s17); the one data block thus integrated is RS-decoded (step s18); and the resultant data block is transmitted as reconstructed (step s20).

If the amount of data buffered in any one of the buffers BF, for example the buffer BF #4, does not reach the specified buffer amount (No in step s31), and if the four buffers BF, except for the buffer BF #4, become full (Yes in step s11), the CPU Xa judges that the one buffer BF #4 is abnormal, and changes the valid number to four (step s12). Further, the CPU Xa starts to perform the read control on the four memory units MU corresponding to the buffers BF which become full (step s13), and issues an alarm warning that the buffer BF #4, namely the memory unit #4, is abnormal.

The error check processor EC checks the header information. If there is no error (No in step s15), the error check processor EC rebuilds the four data blocks by correcting the data read from the memory unit MU #4 through performing the error check on the check sum and the like of the data received from each of the buffers BF #1, #2, #5 as well as the parity check and the like on the data (step s16). Further, the constructed data blocks are integrated into one data block (step s17); the one data block thus integrated is RS-decoded (step s18); and the resultant one data block is transmitted as reconstructed (step s20).

If an error is detected in the header information and the valid number is four (Yes in step s15 and if four in step s15-1), a read control function x2, which receives the alarm from the error check processor EC, judges that abnormality occurs in two or more memory units MU, and performs an additionally-provided abnormality processing procedure (step s21) because the data rebuild is impossible.

The foregoing procedure makes it possible to continue transmitting the data without freezing even if a fault occurs in any one of the memory units MU, because the procedure continuously outputs the data from the remaining normal memory units MU.

Figure 4:
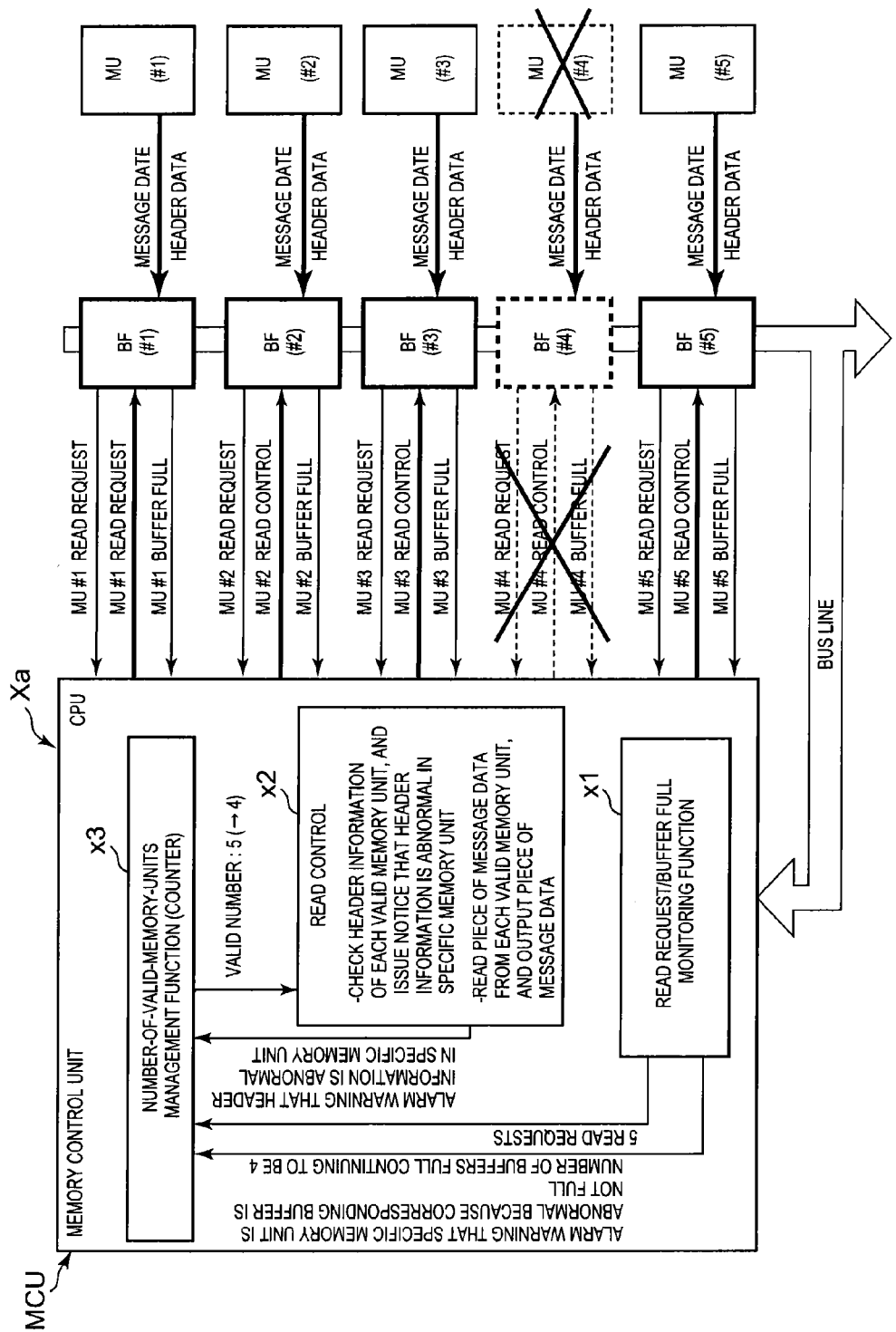
FIG. 4 is a functional block diagram for explaining procedures for valid number management and read control which are carried out by a CPU.

FIG. 4 is a functional block diagram for explaining the procedures for the valid number management and read control which are performed by the CPU Xa in the memory control unit MCU.

In FIG. 4, when put into a read cycle, the memory units MU #1 to #5 outputs pieces of message data rx(abc)& to prx(a-z) and pieces of header data h1 to h5 to the buffers BF #1 to #5, respectively.

If, for example, the data is read from the four memory units MU at 1 Gbps, the read speed for each memory unit MU is 250 Mbps, that is to say, approximately 25 megabytes per second. If a read cycle is a cycle of 50 milliseconds, a round of transfer achieves slightly more than 1 megabytes for each 50 milliseconds. For these reasons, the full size of each buffer BF is set at approximately 100 kilobytes to approximately 500 kilobytes, and the buffer amount which prompts the read request to be started is set at 50 kilobytes which is approximately 10 percent of the full size.

Once each of the buffers BF #1 to #5 completes buffering the specified minimum amount of data bytes which prompts the read request to be transmitted, the buffer BF subsequently sends the read request of the memory unit MU #1 to the CPU Xa. In addition, once the amount of data buffered in each of the buffers BF #1 to #5 reaches 500 kilobytes, the buffer BF sends a notice that the buffer BF becomes full to the CPU Xa.

In accordance with the procedures shown in steps s31 and s11 in the flowchart of FIG. 3, a read request/buffer full monitoring function x1 of the CPU Xa monitors whether or not the read request is received from all the five buffers BF, and whether or not the four buffers BF become full. Further, the read request/buffer full monitoring function x1 informs a number-of-valid-memory-units management function x3 of the result of the monitoring.

After, for example, more than 500 kilobytes of data is buffered in each of the five memory units MU and the number-of-valid-memory-units management function x3 receives the read request from each memory unit MU, the number-of-valid-memory-units management function x3 informs the read control function x2 of the default valid number which is five. The read control function x2 checks the header information from each of the valid memory units MU. If all the five memory units MU are normal, the error check processor EC shown in FIG. 1 performs the error check, correction and rebuild by use of the data read from each of the five memory units MU. Further, the error check processor EC controls the output of the pieces of message data to the integrator RC shown in FIG. 1.

Moreover, in a case where, for example, each of the buffers BF corresponding to the four memory units MU, excluding the memory unit MU #4, buffers more than 500 kilobytes of data and become full, the number-of-valid-memory-units management function x3 is informed of the alarm warning that the memory unit MU #4 is abnormal. On the basis of this information, the number-of-valid-memory-units management function x3 changes the valid number to four, and informs the read control function x2 of the resultant valid number.

The read control function x2 checks the header information of the data received from each of the four valid memory units MU. If all the four memory units MU are normal, the read control function x2 controls: the rebuild of the data stored in the memory unit MU #4 by performing the error check and error correction for the purpose of making up for the data of the memory unit MU #4 from which no data is read; and the output of the piece of message data to the integrator RC shown in FIG. 1. The integrator RC integrates the data blocks read from the four normal memory units MU into one data block, and outputs the one data block thus integrated.

Even if the read request is received from each of the five memory units MU, if the header information from the memory unit MU #4, for example, is abnormal as the result of the check performed by the error check processor EC, the number-of-valid-memory-units management function x3 is informed of the alarm warning that the memory unit MU #4 is abnormal. On the basis of this information, the number-of-valid-memory-units management function x3 changes the valid number to four, and informs the read control function x2 of the resultant valid number.

The read control function x2 controls the output of the pieces of message data of the respective valid memory units MU to the integrator RC shown in FIG. 1. In other words, the error check processor EC controls: the removal of the piece of message data of the memory unit MU #4 which is judged as being abnormal; and the rebuild using the data of the four normal memory units MU for the purpose of making up for the data of the memory unit MU #4.

Furthermore, in a case where the valid number is set at four because the buffers BF become full, if abnormality is detected in the header information of any one of the four valid memory units MU, the read control function x2, which receives the alarm from the error check processor EC, performs the additionally-provided abnormality processing procedure.

It should be noted that: the parity data is stored in the memory unit MU #5; in a case where abnormality is detected in which the amount of data buffered in the buffer BF #5 does not reach a specified buffer amount, for example, 50 kilobytes, and no data is transmitted from the memory unit MU #5, it is assumed that the data read from each of the remaining memory units MU #1 to #4 is normal; and the integration process is performed by bypassing the parity process.

Figure 5:
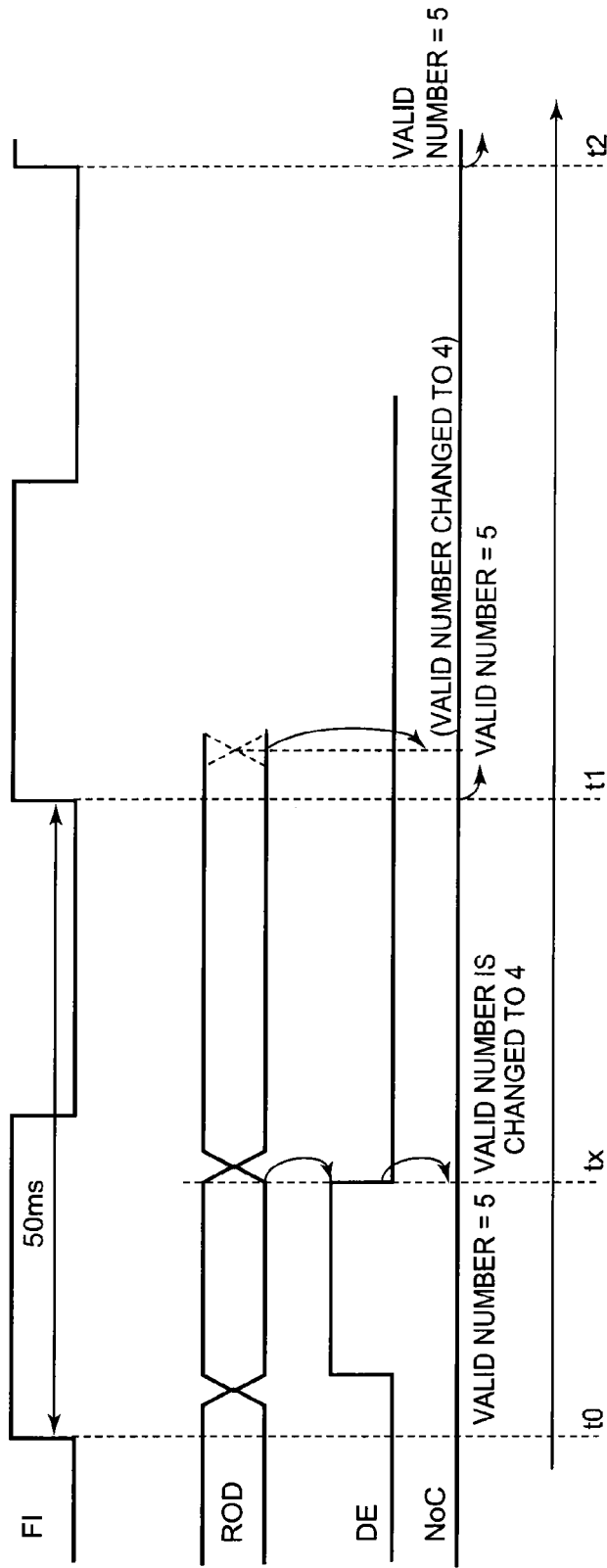
FIG. 5 is a diagram for explaining execution timings of the process procedures related to FIG. 4.

FIG. 5 is a diagram for explaining execution timings of the process procedures related to FIG. 4.

In FIG. 5, the CPU Xa checks and monitors the valid number for each read cycle F1 whose period is 50 milliseconds. As shown on a line indicated by reference sign NoC at timing t0, the valid number is set at five. A flag meaning data enable (DE) which enables all the data to be read is put. As shown on lines indicated by reference sign ROD (read of data), the data is continuously read and buffered in each buffer BF. However, once a notice that four buffers become full is received at timing tx, the flag meaning the DE is cancelled, and the valid number is changed to four, as well as the read data is transmitted from only the valid memory units MU except for the memory unit MU #4.

The process of changing the valid number to the four is similarly performed if the error check processor EC detects abnormality while checking the header information. Further, the process continues being performed on the four memory units MU which are counted in the valid number from timing t0 through timing t1 at which 50 milliseconds passes after timing t0.

In a case where the number of buffers BF full continues to be four even in a cycle ensuing after timing t1, the read operation accompanied by the rebuild continues with the valid number remaining four. For this reason, no freeze takes place, and neither the standby nor delay time occurs due to the timer process and the like.

On the other hand, in a case where the read request is transmitted from all the five memory units MU in the next read cycle, the CPU Xa returns the valid number in the counter of the number-of-valid-memory-units management function x3 to five which is the default value. In a case where the disorder of the memory unit MU #4 is a simple read error or the like and accordingly returns to normal within a short time, the CPU Xa immediately returns to the normal operation using the original five memory units (MU).

If the state in which the valid number is four continues specified times of repetition or longer than a specified length of time, the CPU Xa additionally performs a specified disorder recovery procedure aiming at maintenance, such as the issuing of an alarm warning that a disorder/error occurs in the memory unit MU, by referring to the counter or timer (not illustrated).

Even while reading data from the multiple memory units in parallel, the information memory system of at least one embodiment, which has been described above, reads the data from only the normal memory units by: detecting a memory unit, whose corresponding buffer BF does not become full within a periodic read cycle, as abnormal; and excluding the abnormal memory unit from the target memory units from which to read the data. Accordingly, it is possible to provide the information memory system capable of reading the data without freezing even when a read abnormality occurs.

Although the foregoing descriptions have been provided for several embodiments, these embodiments have been presented as examples, and are not intended to limit the scope of the invention. These embodiments can be carried out in other various modes. Various omissions, replacements and modifications can be made within the scope not departing from the gist of the invention. These embodiments and their modifications are included in the scope and gist of the invention, as well as similarly in the invention as recited in the scope of claims and its scope of equivalence.

What is claimed is:

1. An information memory system in which data received serially is divided into pieces of data, which are then programmed to and stored in a plurality of flash-memory-equipped large-capacity memory units in parallel, the information memory system including a processor for rebuild configured: to detect an error in a piece of data read from at most one of the plurality of flash-memory equipped large-capacity memory units; and to perform correction and rebuild, and the information memory system configured to integrate the pieces of data read from the flash-memory equipped large-capacity memory units in parallel into integrated serial data, and to output the integrated serial data, the information memory system comprising:

a plurality of buffers respectively connected to the plurality of flash-memory equipped large-capacity memory units, each buffer configured to buffer a received piece of read data, to output a read request if the amount of read data buffered in the buffer exceeds a specified buffer amount, and to output a buffer full notice when the buffer buffers the received piece of read data up to its full capacity; and controller configured to store the number of the divided pieces of data as the number of valid memory units, and monitoring the read request and the buffer full notice, in a case where the number of read requests reaches the number of valid memory units, performing read control on all the plurality of flash-memory equipped large-capacity memory units, and controlling the integration of the pieces of read data and the output of the integrated serial data, in a case where the number of read requests does not reach the number of valid memory units and the buffer full notice continues in all the plurality of buffers except for one buffer which does not output the read request, decrementing the number of valid memory units by one, performing the read control on the flash-memory equipped large-capacity memory units corresponding to the buffers which output the buffer full notice, and then performing control of the integration of a piece of data reconstructed by the processor for rebuild after being read from the valid memory units corresponding to the buffer which does not output the read request and the pieces of data read from the valid memory units corresponding to the buffers which output the buffer full notice, and the output of the integrated serial data.

2. The information memory system of claim 1, wherein the processor for rebuild configured: to add pieces of header information to the respective divided pieces of data which are to be stored in parallel; to judge whether or not the pieces of header information added to the respective pieces of data which are read in parallel are normal; and if any one piece of header information is abnormal, to inform the controller of the abnormality in the corresponding memory unit, the controller performs such control as to perform the rebuild process in a case where the number of read requests reaches the number of valid memory units at a timing when the controller is informed of the abnormality of the header information, or in a case where the controller is not informed of the abnormality of the header information at a timing when the controller completes reception of the buffer full notices, and the controller performs such control as not to perform the rebuild and integration processes in a case where the controller is informed of the abnormality of the header information at a timing when the controller completes reception of the buffer full notices.

3. A memory abnormality processing method for an information memory system, the information memory system including: a plurality of flash-memory equipped large-capacity memory units; a plurality of buffers; rebuild means for detecting an error in a piece of data read from at most one of the plurality of flash-memory equipped large-capacity memory units, and performing correction and rebuild; and a controller, the information memory system in which: data received serially is divided into a plurality of pieces of data, which are then programmed to and stored in the plurality of flash-memory-equipped large-capacity memory units in parallel; and the plurality of pieces of data read from the respective flash-memory equipped large-capacity memory units in parallel are integrated into serial data, and the serial data is transmitted, the memory abnormality processing method wherein the plurality of buffers are connected to the plurality of flash-memory equipped large-capacity memory units respectively, and each buffer buffers a received piece of read data, outputs a read request if the amount of read data buffered in the buffer exceeds a specified buffer amount, and outputs a buffer full notice when the buffer buffers the received piece of read data up to its full capacity, and the controller stores the number of the divided pieces of data as the number of valid memory units, and monitors the read request and the buffer full notice, in a case where the number of read requests reaches the number of valid memory units, the controller performs read control on all the plurality of flash-memory equipped large-capacity memory units, and controls the integration of the pieces of read data and the output of the integrated serial data, in a case where the number of read requests does not reach the number of valid memory units and the buffer full notice continues in all the plurality of buffers except for one buffer which does not output the read request, the controller decrements the number of valid memory units by one; performs the read control on the valid memory units corresponding to the buffers which output the buffer full notice; and performs control of the integration of a piece of data reconstructed by the rebuild means after being read from the valid memory units corresponding to the buffer which does not output the read request and the pieces of data read from the valid memory units corresponding to the buffers which output the buffer full notice, and the output of the integrated serial data.

* * * * *